(12) United States Patent  (10) Patent No.: US 8,074,227 B2
Antonio et al.  (45) Date of Patent: Dec. 6, 2011

(54) UTILIZING A FIRST MANAGED PROCESS TO HOST AT LEAST A SECOND MANAGED PROCESS

(75) Inventors: Michael J. Antonio, Seattle, WA (US); David R. Fulmer, Redmond, WA (US); Vivek B. Dalvi, Bellevue, WA (US); David P. Relyea, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 11/703,978

(22) Filed: Feb. 8, 2007

(65) Prior Publication Data

US 2008/0196038 A1  Aug. 14, 2008

(51) Int. Cl.
  *G06F 3/00* (2006.01)
  *G06F 3/048* (2006.01)
(52) U.S. Cl. .......... 719/310; 715/773
(58) Field of Classification Search ............ 719/310; 715/738, 773; 709/310
  See application file for complete search history.

(56) References Cited

U.S. PATENT DOCUMENTS

| | | | |
|---|---|---|---|
| 7,171,475 B2 * | 1/2007 | Weisman et al. | 709/227 |
| 7,321,926 B1 * | 1/2008 | Zhang et al. | 709/220 |
| 7,814,171 B2 * | 10/2010 | Blegen et al. | 709/217 |
| 2002/0040346 A1 * | 4/2002 | Kwan | 705/51 |
| 2003/0197737 A1 | 10/2003 | Kim | |
| 2004/0135820 A1 | 7/2004 | Deaton et al. | |
| 2005/0091672 A1 | 4/2005 | Debique et al. | |
| 2005/0140694 A1 | 6/2005 | Subramanian et al. | |
| 2005/0278261 A1 * | 12/2005 | Omanson et al. | 705/77 |
| 2006/0041892 A1 | 2/2006 | Need | |
| 2006/0103655 A1 | 5/2006 | Nelson et al. | |
| 2006/0233106 A1 * | 10/2006 | Achlioptas et al. | 370/235 |
| 2006/0265386 A1 * | 11/2006 | Richter | 707/10 |
| 2007/0297029 A1 | 12/2007 | Low et al. | |
| 2008/0082666 A1 * | 4/2008 | Brandstatter | 709/226 |
| 2009/0164564 A1 * | 6/2009 | Willis | 709/203 |

FOREIGN PATENT DOCUMENTS

WO   WO0180098 A2   10/2001

OTHER PUBLICATIONS

Min Wu, Do security toobars actually prevent phishing attacks, 2006.*
Bishop, Judith, "Multi-platform User Interface Construction—A Challenge for Software Engineering-in-the-Small", Date: 2006, pp. 751-760, ACM Press, NY, USA, delivery.acm.org/10.1145/1140000/1134404/p751-bishop.pdf?key1=1134404&key2=6719442611&coll=GUIDE&dl=GUIDE&CFID=5011585&CFTOKEN=95967115.
Brandt, et al., "Microsoft's New Operating System—Longhorn", Date: 2005, vol. 6, No. 2, iacis.org/iis/2005_IIS/PDFs/LandecheBrandt_Shorter.pdf.
Leavitt, Neal, "Browsing the 3D Web", Date: Sep. 2006, csdl2.computer.org/comp/mags/co/2006/09/r9018.pdf.

* cited by examiner

*Primary Examiner* — Lechi Truong (57) ABSTRACT

A system and method for utilizing a first managed process to host at least a second managed process is disclosed. The technology initially provides a first managed process. The first managed process hosting at least a second managed process. An unmanaged process is then provided to facilitate communication between the first managed process and the second managed process, such that a user can automatically communicate with the first managed process while the second managed process is operational and the first managed process is in the background without requiring the user to select the first managed process.

20 Claims, 8 Drawing Sheets

```
PROVIDES A FIRST MANAGED PROCESS.
510
        │
        ▼
HOSTS AT LEAST A SECOND MANAGED PROCESS WITHIN THE FIRST
MANAGED PROCESS.
520
        │
        ▼
PROVIDES AN UNMANAGED PROCESS TO FACILITATE COMMUNICATION
BETWEEN THE FIRST MANAGED PROCESS AND THE SECOND MANAGED
PROCESS, THE UNMANAGED PROCESS ALLOWING A USER TO
AUTOMATICALLY COMMUNICATE WITH THE FIRST MANAGED PROCESS
WHILE THE SECOND MANAGED PROCESS IS OPERATIONAL AND THE
FIRST MANAGED PROCESS IS IN THE BACKGROUND WITHOUT
REQUIRING THE USER TO SELECT THE FIRST MANAGED PROCESS.
530
```

UTILIZING A FIRST MANAGED PROCESS TO HOST AT LEAST A SECOND MANAGED PROCESS

BACKGROUND

Presently, computer systems are used throughout daily life for both work and entertainment purposes. For example, most office employees are provided with a computer system on which to work. Moreover, many households have a computing system in the home. Many of the home computers are used for various forms of entertainment such as, listening to music, watching television, surfing the Internet, online collaboration while playing a video game, and the like.

Advances in computer processing power, hard drive size, and the like, have continually allowed computers to further integrate with daily activities. For example, a home computer may be used to manage audio and video system in a house. That is, the user will connect a television, speakers, surveillance cameras, and a plurality of other devices into a network with the computing system acting as the controller. Then, with respect to audio activities, for example, a user can play music to different locations throughout the house by simply selecting the desired functionality on the computing system.

However, problems still exist with respect to the utilization of a computer managing a number of activities simultaneously. For example, suppose a user is utilizing a computing system to listen to music. In many cases, in order to perform the music receiving and broadcasting operation, a music application is utilized. When the music application is in operation, it is at the foreground of operation for the computing system. That is, if a mouse is moved or a button is clicked, the input is provided to the application in the foreground and not any applications which may be operating in the background.

While the ability to run several applications concurrently has advantages associated therewith, such functionality is not without drawbacks. For example, if a user is listening to music utilizing a music application and the user begins to surf the web with a web browser application, significant difficulties may be encountered. For example, if a user is surfing the web and wishes to turn down the music in one of the rooms of the house from the music application, then the user will have to select the music application and then interact with the music application to obtain the desired changes. To return to surfing the web, the user would then have to re-select the browser application and continue surfing. This type of application navigation becomes even more confusing as more and more applications are running at the same time in different stages of foreground and background operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and method for utilizing a first managed process to host at least a second managed process is disclosed. The technology initially provides a first managed process. The first managed process hosts at least a second managed process. An unmanaged process is then provided to facilitate communication between the first managed process and the second managed process, such that a user can automatically communicate with the first managed process while the second managed process is operational and the first managed process is in the background without requiring the user to select the first managed process.

Furthermore, the present technology provides a system and method for utilizing a first managed process to host at least a second managed process regardless of the communication type utilized by the two processes. Moreover, the present technology allows the hosted process to be launched as a full-screen application in a computing environment, while remaining a well-behaved application within the host process.

DESCRIPTION OF THE DRAWINGS

The accompanying drawings, which are incorporated in and form a part of this specification, illustrate embodiments of the technology for utilizing a first managed process to host at least a second managed process and, together with the description, serve to explain principles discussed below.

The drawings referred to in this description should be understood as not being drawn to scale except if specifically noted.

DETAILED DESCRIPTION

Reference will now be made in detail to embodiments of the present technology for utilizing a first managed process to host at least a second managed process, examples of which are illustrated in the accompanying drawings. While the technology for utilizing a first managed process to host at least a second managed process will be described in conjunction with various embodiments, it will be understood that they are not intended to limit the present technology for utilizing a first managed process to host at least a second managed process to these embodiments. On the contrary, the presented technology for utilizing a first managed process to host at least a second managed process is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for utilizing a first managed process to host at least a second managed process. However, the present technology for utilizing a first managed process to host at least a second managed process may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "performing", "generating", "displaying", "selecting", "scrolling", "highlighting", "presenting", "testing", "identifying", "reporting", "prompting", "suppressing", "providing", and "refreshing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for utilizing a first managed process to host at least a second managed process is also well suited to the use of other computer systems such as, for example, optical and mechanical computers. Additionally, it should be understood that in embodiments of the present technology for utilizing a first managed process to host at least a second managed process, one or more of the steps can be performed manually.

Example Computer System Environment

Figure 1:
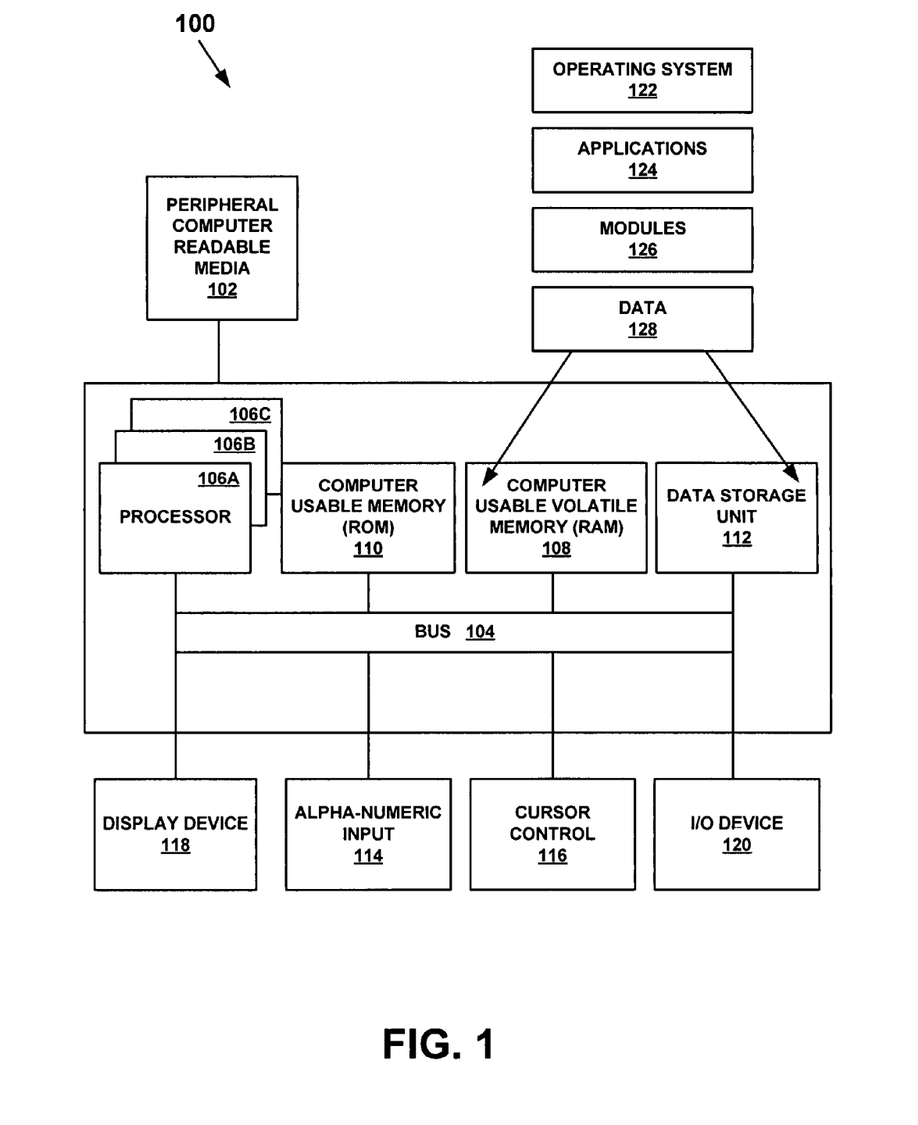
FIG. 1 is a diagram of an exemplary computer system used in accordance with embodiments of the present technology for utilizing a first managed process to host at least a second managed process.

With reference now to FIG. 1, portions of the technology for utilizing a first managed process to host at least a second managed process are composed of computer-readable and computer-executable instructions that reside, for example, in computer-usable media of a computer system. That is, FIG. 1 illustrates one example of a type of computer that can be used to implement embodiments, which are discussed below, of the present technology for utilizing a first managed process to host at least a second managed process.

FIG. 1 illustrates an exemplary computer system 100 used in accordance with embodiments of the present technology for utilizing a first managed process to host at least a second managed process. It is appreciated that system 100 of FIG. 1 is exemplary only and that the present technology for utilizing a first managed process to host at least a second managed process can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, such as random access memory (RAM), coupled to bus 104 for storing information and instructions for processors 106A, 106B, and 106C.

System 100 also includes computer usable non-volatile memory 110, such as read only memory (ROM), coupled to bus 104 for storing static information and instructions for processors 106A, 106B, and 106C. Also present in system 100 is a data storage unit 112 (for example, a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alphanumeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for utilizing a first managed process to host at least a second managed process is found below.

Referring still to FIG. 1, various other components are depicted for system 100. Specifically, when present, an operating system 122, applications 124, modules 126, and data 128 are shown as typically residing in one or some combination of computer usable volatile memory 108, and data storage unit 112. In one embodiment, the present technology for utilizing a first managed process to host at least a second managed process, for example, is stored as an application 124 or module 126 in memory locations within RAM 108 and memory areas within data storage unit 112.

The computing system 100 is only one example of a suitable computing environment and is not intended to suggest any limitation as to the scope of use or functionality of the present technology. Neither should the computing environment 100 be interpreted as having any dependency or requirement relating to any one or combination of components illustrated in the exemplary computing system 100.

The present technology is operational with numerous other general-purpose or special-purpose computing system environments or configurations. Examples of well known computing systems, environments, and configurations that may be suitable for use with the present technology include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Overview

In one embodiment, the present technology provides a method and system for utilizing a first managed process to host at least a second managed process. In general, the term managed process refers to a process that, when active, will control the performance and execution for any type of activity occurring with respect to a computing system within which it is operating. Thus, two managed processes are usually unable to operate at the same time since each managed process will contend for control of input, performance and execution within the system.

However, the present technology provides a novel system and method for allowing two managed processes to be operational at the same time without contesting for control of the computing environment. That is, the present technology provides a capability for a first managed process to host at least a second managed process such that the control of the computing environment may be interchanged between the two managed processes.

In general, the hosting of one or more managed processes begins with the initiation of the host process. Once the host process is operating, then the hosted process is initiated within the host process environment. In other words, the two managed processes can operate at the same time in the same computing environment because one is acting as a host and the other is operating within the environment provided by the host. For example, a user may have a media application acting as the host process and have a browser application running as the hosted process. However, in some cases, communication problems may result when hosting one managed process with a second managed process.

In one embodiment, an unmanaged communications process is used to enable communications between the hosted process and the host process. In general, the unmanaged communications process utilizes a line of communication that is different than the communication methods utilized by the host and hosted process. For example, in one embodiment, the unmanaged communication process may utilize a .NET technology for communication while the host and hosted process communicate utilizing a Component Object Model (COM) platform. In general, .NET is a generic top level domain used in areas such as the domain name system utilized on the Internet, while COM is an object-oriented programming model used to define how objects interact within a single application or between applications.

Once communication between the host process and the hosted process is established, the hosted process will provide a list of desired message types to the host process.

In general, a message is generated by the computing environment when an input such as a keystroke, mouse click, or the like is received. Moreover, the message has a message type, similar to a header, and a message body containing the message information. For example, in operation, a user will perform an input action such as a volume adjustment utilizing a remote control. The resulting message will include a message type such as "remote control", "remote control volume", "volume", or the like, while the message body will include the complete volume adjustment request.

In one embodiment, the communication between the host and hosted processes is organized such that any message received at the computing environment is provided directly to the host process. For example, if a hosted process is currently in the foreground of operation, any input will result in a message that is passed directly to the host process without having to select the host process or deselect an active hosted process.

When a message is received at the host process, the host process will access a list of desired message types provided by the hosted process and compare the received message type with the message types on the list. In one embodiment, if the received message type is on the list of message types then the host process will pass the message to the hosted process. However, if the message type does not match any of the message types on the list, then the host process will be the default receiver of that message.

For example, assume that a user has a media application acting as the host process and has a browser application running as the hosted process. During the initial hosting of the browser application, the browser application will provide a list of desired message types to the host process. When a message is generated, the message will be passed to the media application. The media application will compare the message type against the list of message types provided by the browser application. If the message type matches a message type on the list, then the message will be directed to the browser application. However, if the message type is not on the list then the message will be directed to the media application.

In one embodiment, if the message is directed toward the media application operating in the background, the media application will act on the message while remaining in the background. In another embodiment, the media application may provide a user interface (UI) at a portion of the foreground of the display without actually bringing the media application to the foreground of operation or delegating the browser application to the background.

In general, the foreground of operation refers to an application that is being actively used. That is, an application that is actively or ready to actively receive user input. An application operating in the background refers to an application that may be operating or opened but is not actively receiving user input.

Architecture

Figure 2:
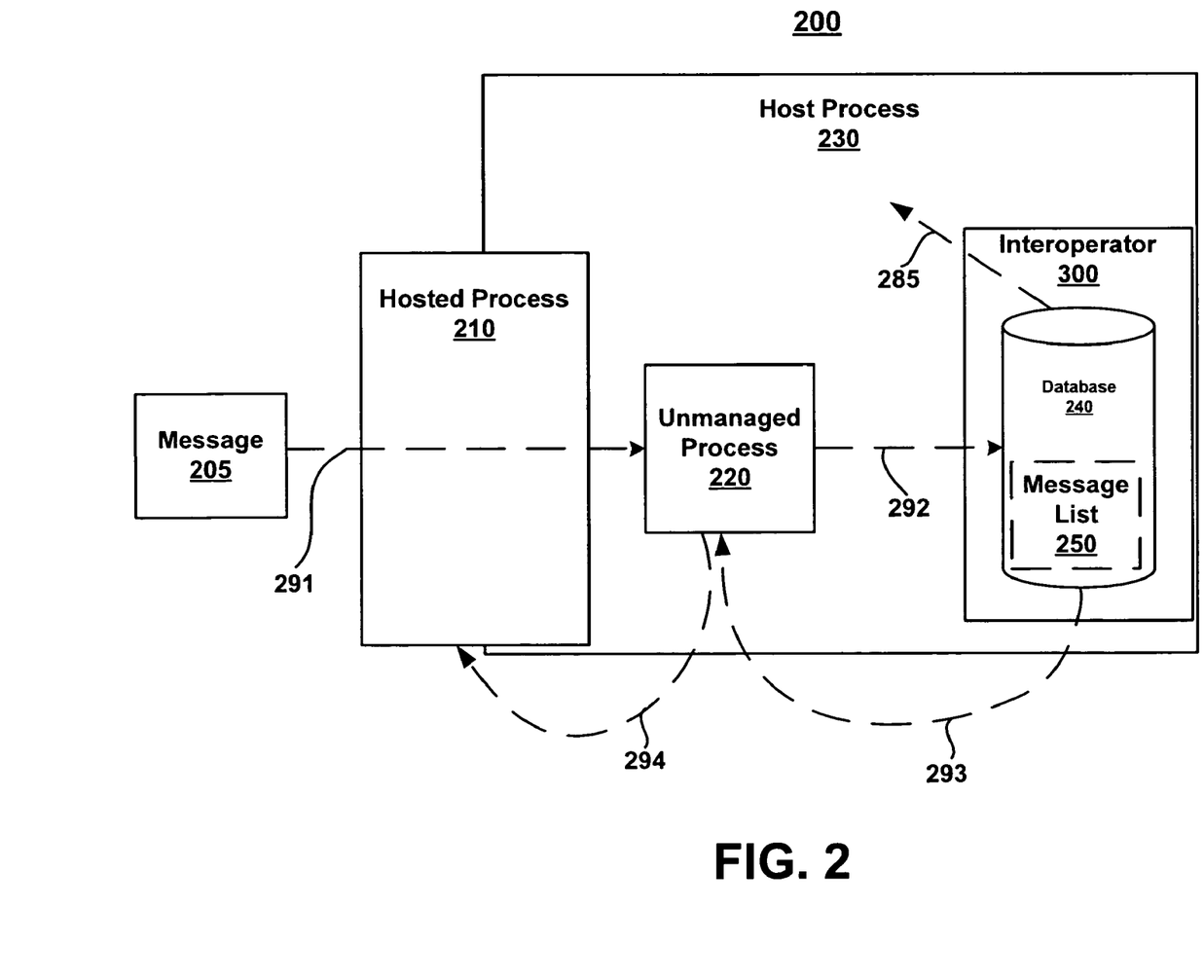
FIG. 2 is a block diagram of an exemplary system having a hosted process and host process in accordance with one embodiment of the present technology.

With reference now to FIG. 2, a block diagram of an exemplary system 200 having a hosted process 210 and host process 230 is shown in accordance with one embodiment of the present technology. In general, hosted process 210 and host process 230 are managed processes. In one embodiment, hosted processes 210 is a presentation foundation browser application. In another embodiment, host process 230 is a media application. Although a single hosted process 210 is shown in FIG. 2, the present technology is well suited to host process 230 hosting a plurality of hosted processes. The depiction of only a single hosted process 210 is provided herein for purposes of brevity and clarity.

In one embodiment, hosted process 210 and host process 230 utilize Component Object Model (COM), an object-oriented programming model, to define how objects interact within a single application or between applications. Although COM works well for communication between layout engines structured using hypertext mark-up language (HTML) when they are in-process, when an application such as hosted process 210 is out-of-process with respect to host process 230 communications issues may arise. Although, HTML is described as the language used to structure the layout engine herein, the present technology is well suited for use with other layout engines structured using various coding languages.

In general, an out-of-process application refers to an application that runs in a memory space that is different from the host application process. One advantage of using out-of-process applications is that they can be stopped and started independently from one another. Moreover, if an out-of-process application crashes it may not bring down the host process or the entire computing system.

In order to provide communication between host process 230 and hosted process 210, when they are out-of-process, a different line of communication is needed. In one embodiment, the different line of communication is provided by unmanaged process 220 in the form of a .NET protocol.

Referring still to FIG. 2, host process 230 also includes an interoperator 300 software module and a database 240 having a message type list 250 stored therein. In general, message type list 250 is a list of messages that hosted process 210 is interested in receiving. For example, when hosted process 210 is in the foreground of operation, a user may provide an input such as a keystroke or mouse movement. In one embodiment, the computing system generates a message 205 based on the input. Message 205 will have a message type associated therewith. The message 205 is then passed via message path 291 from hosted process 210 to unmanaged process 220. Unmanaged process 220 then passes message 205 via message path 292 to interoperator 300. In one embodiment, the interoperator 300 is integrated with host process 230. In another embodiment, interoperator 300 is distinct from host process 230. For example, interoperator 300 may be remotely located from host process 230 and may be accessed by host process 230 wirelessly, via the Internet, or the like.

At interoperator 300, the message type associated with message 205 is compared with the message types on message type list 250. In one embodiment, if the message type of message 205 matches up with a message type of interest to hosted process 210 on message type list 250, then message 205 is filtered via message path 293, unmanaged process 220, and message path 294 to hosted process 210 for review and implementation. However, if the message type of message 205 does not match a message type on message type list 250, then message 205 is filtered, via message path 285, to host process 230 for review and implementation. Although a number of message paths are described herein, the present technology is well suited to more or fewer paths. The present path description is merely one embodiment and is provided for purposes of brevity and clarity.

Moreover, in one embodiment, if hosted process 210 is in the foreground of operation and message 205 is directed toward the background host process 230 a UI will be provided in the foreground. In one embodiment, the UI will allow the user to interact with the desired host process 230 without requiring any intermediate actions such as selecting host process 230 from the background. This is shown and described in more detail herein in conjunction with the discussion of FIG. 4A-C.

Figure 3:
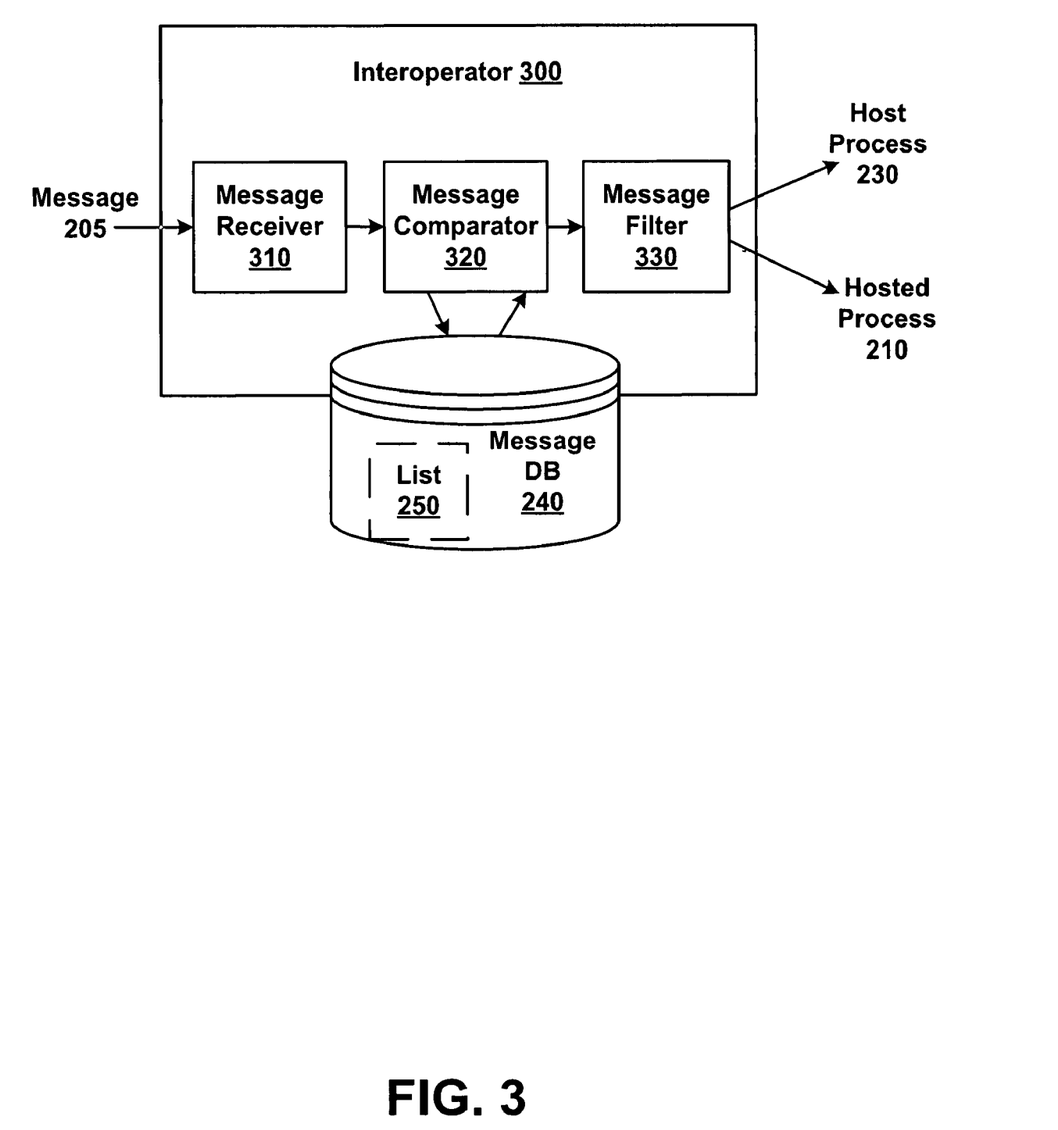
FIG. 3 is a block diagram illustrating additional features of the interoperator of FIG. 2 in accordance with one embodiment of the present technology.

With reference now to FIG. 3, a block diagram illustrating additional features of interoperator 300 of FIG. 2 is shown in accordance with one embodiment of the present technology. In general, interoperator 300 includes a message receiver 310, a message comparator 320, and a message filter 330. Interoperator 300 performs a process of message filtering. That is, a message 205 is received at message receiver 310. Message receiver 310 then passes message 205 to message comparator 320. Message comparator 320 compares the message type associated with message 205 with message type list 250 stored on database 240. If the message type is on message type list 250 as a message type of interest to hosted process 210, then message 205 is filtered via message filter 330 to hosted process 210 for review and implementation. However, if the message type is not on message type list 250, then message 205 is filtered via message filter 330 to host process 230 for review and implementation. In so doing, the present technology allows a user to access any of the host or hosted processes with a single message input regardless of which of the interoperable processes are in the foreground of operation in the computing system.

Figure 4A:
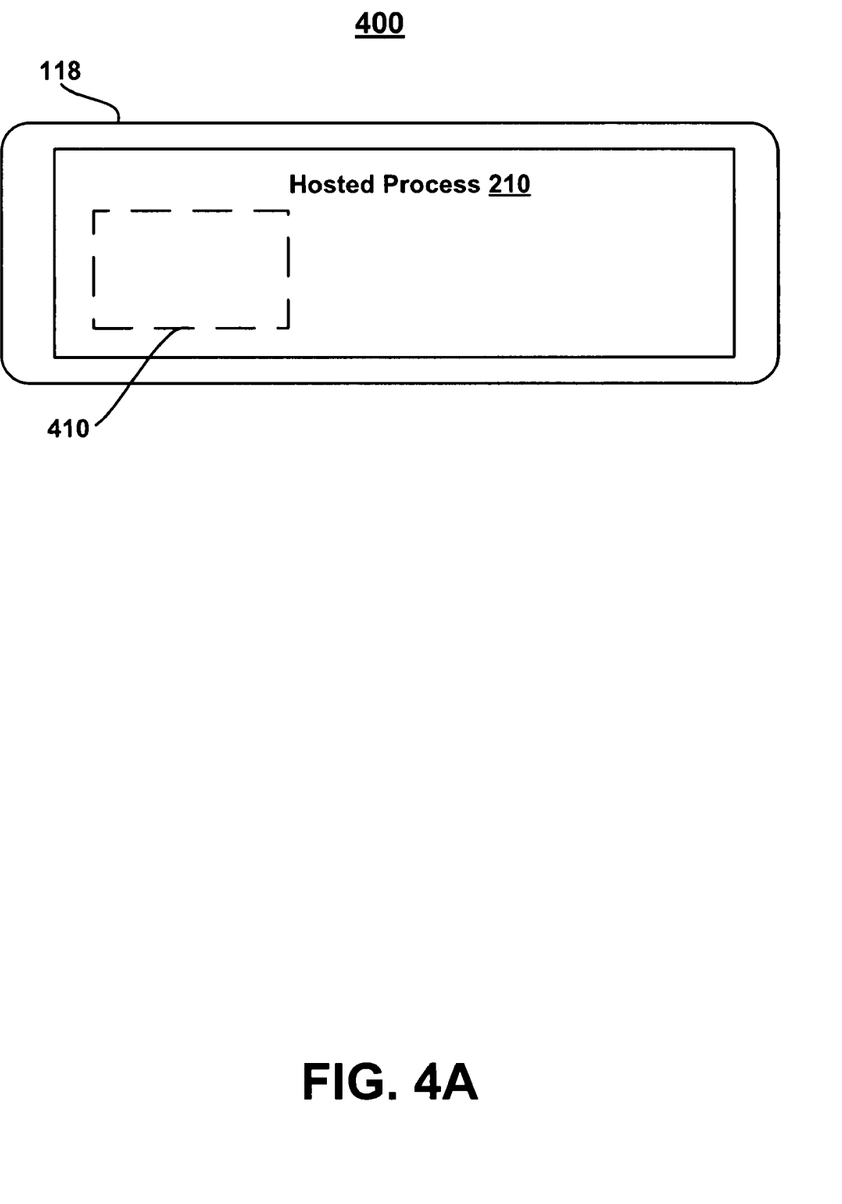
FIG. 4A is a diagram depicting an exemplary display having a hosted process displayed thereon in accordance with one embodiment of the present technology.

Referring now to FIG. 4A, a diagram 400 depicting an exemplary display 118 having hosted process 210 operating in the foreground is shown in accordance with one embodiment of the present technology. That is, hosted process 210 is operating in the foreground of display 118 while host process 230 is in the background. In one embodiment, host process 230 may not even be visible on the display. The following example will use FIGS. 4A through 4C to illustrate one embodiment of the present technology. For example, the host process 230 may be a media application that controls a television in the user's living room while the hosted process 210 may be any type of managed process.

With reference still to FIG. 4A, diagram 400 also includes an optionally present UI 410. In other words, UI 410 is related to host process 230 and is not visible on display 118 until host process 230 receives a message. For purposes of clarity, UI 410 is shown with a dotted line configuration to illustrate that it may be in either the background or the foreground of display 118. In one embodiment, UI 410 is a standard UI pop-up window for host process 230. That is, UI 410 will be generated by the host process 230 and displayed on display 118 for the user when host process 230 is accessed. In another embodiment, UI 410 for host process 230 may be a custom UI, a default UI, a UI generated by hosted process 210, a UI based on the host process 230 or the like.

Figure 4B:
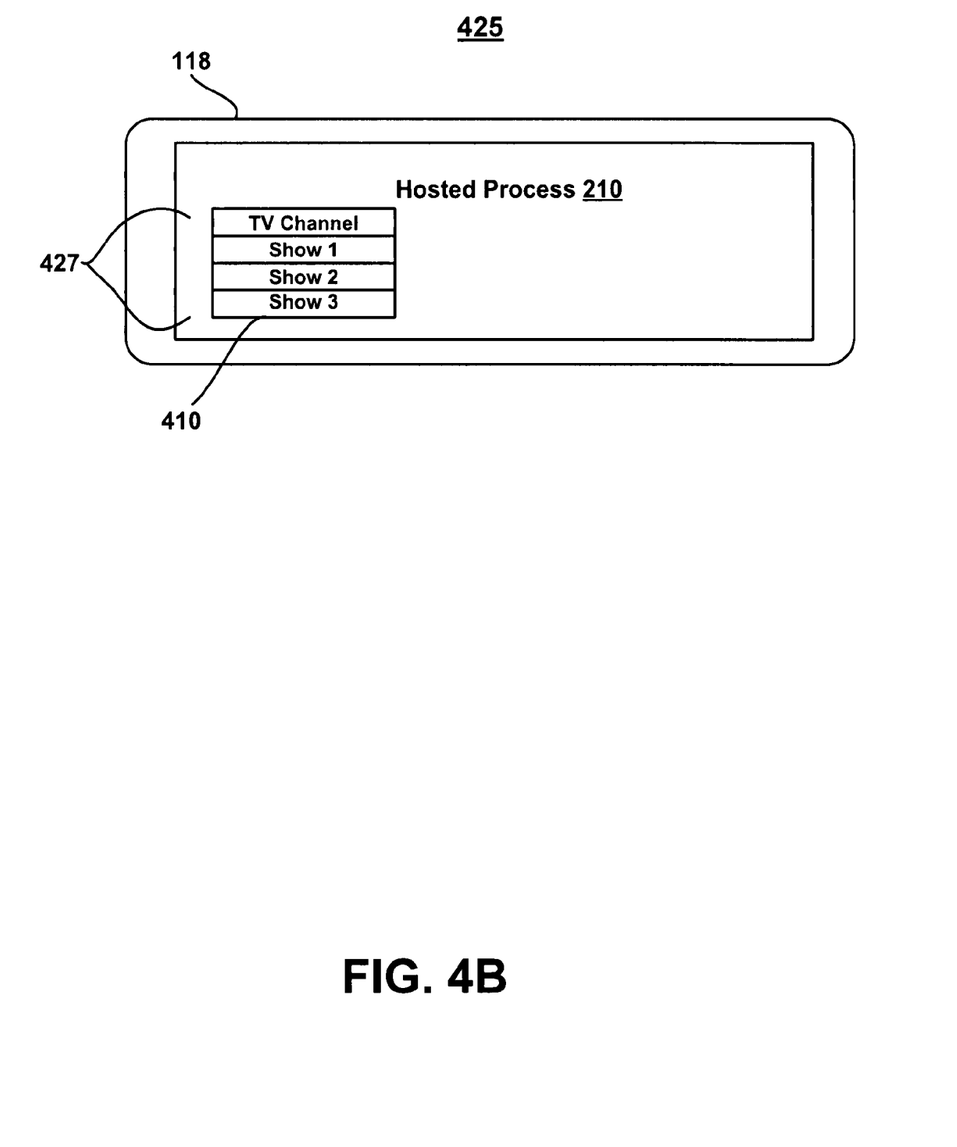
FIG. 4B is a diagram depicting an exemplary display having a hosted process and a UI displayed thereon in accordance with one embodiment of the present technology.

Referring now to FIG. 4B, diagram 425 depicting an exemplary display 118 having hosted process 210 and UI 410 displayed thereon is shown in accordance with one embodiment of the present technology. In one embodiment, at 425, the user is utilizing hosted process 210 and decides to access the underlying host process 230. For example, the user may wish to change the channel, view a show guide, or otherwise interact with the television via the media application comprising host process 230.

Normally, in order to access the media application, such as to change the channel on the television, the user would have to stop interacting with the hosted process 210 and move it to the background. In addition, the user would also need to select the host process 230 to make it active. Once the host process 230 was active in the foreground, the user is then able to interact with host process 230 and access the television controls. Once the television controls were accessed, the user could view the channel guide and select a show. After selecting the show, the user would then be required to move host process 230 to the background, select hosted process 210 and wait for the hosted process 210 to return to the foreground on the display before the user could resume interacting with hosted process 210.

However, the present technology significantly changes the overall interaction process between the user and the host and hosted applications. For example, when a user is utilizing hosted process 210 and wishes to change a television channel utilizing the underlying host process 230, the user will generate a message by, for example, pushing the "guide" button on the user's remote control. Interoperator 300, of FIG. 3, will then filter the message to the designated process. For purposes of the present example, the designated process will be host process 230. In one embodiment, since host process 230 is not actively displayed in the foreground of display 118, UI 410 will be presented in the foreground in response to the received message. In one embodiment, since the message was a TV show listing request, the provided UI 410 will include a listing of shows 427.

Figure 4C:
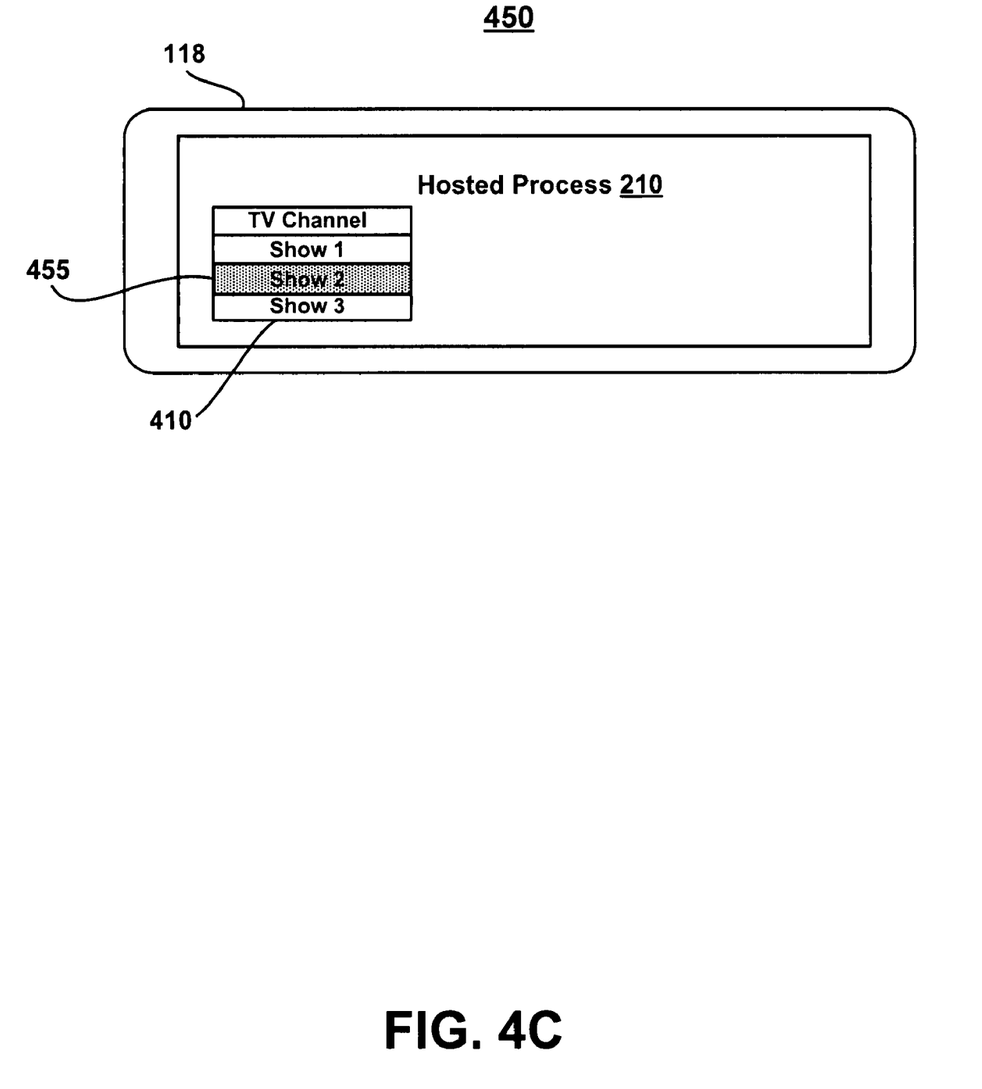
FIG. 4C is a diagram depicting an exemplary display having a hosted process and a UI displayed with selectable areas thereon in accordance with one embodiment of the present technology.

With reference now to FIG. 4C, in one embodiment, the user is able to interact with UI 410 and perform a selection 455. Once the selection 455 is made, the TV channel will be changed and UI 410 will be removed from the active field of view. That is, in one embodiment, the display 118 will return to an embodiment such as shown in FIG. 4A wherein only hosted process 210 is visible. Moreover, hosted process 210 will have remained in the foreground of display 118 the entire time the TV channel selection occurred. Thus, the user is able to select and interact with the host process 230 without having to modify the foreground/background status of either host process 230 or hosted process 210.

In another embodiment, the message will be delivered to host process 230 and the operation will be performed on the background host process 230 without requiring any type of UI 410 and without bringing any portion of host process 230 into the foreground of operation.

Operation

Figure 5:
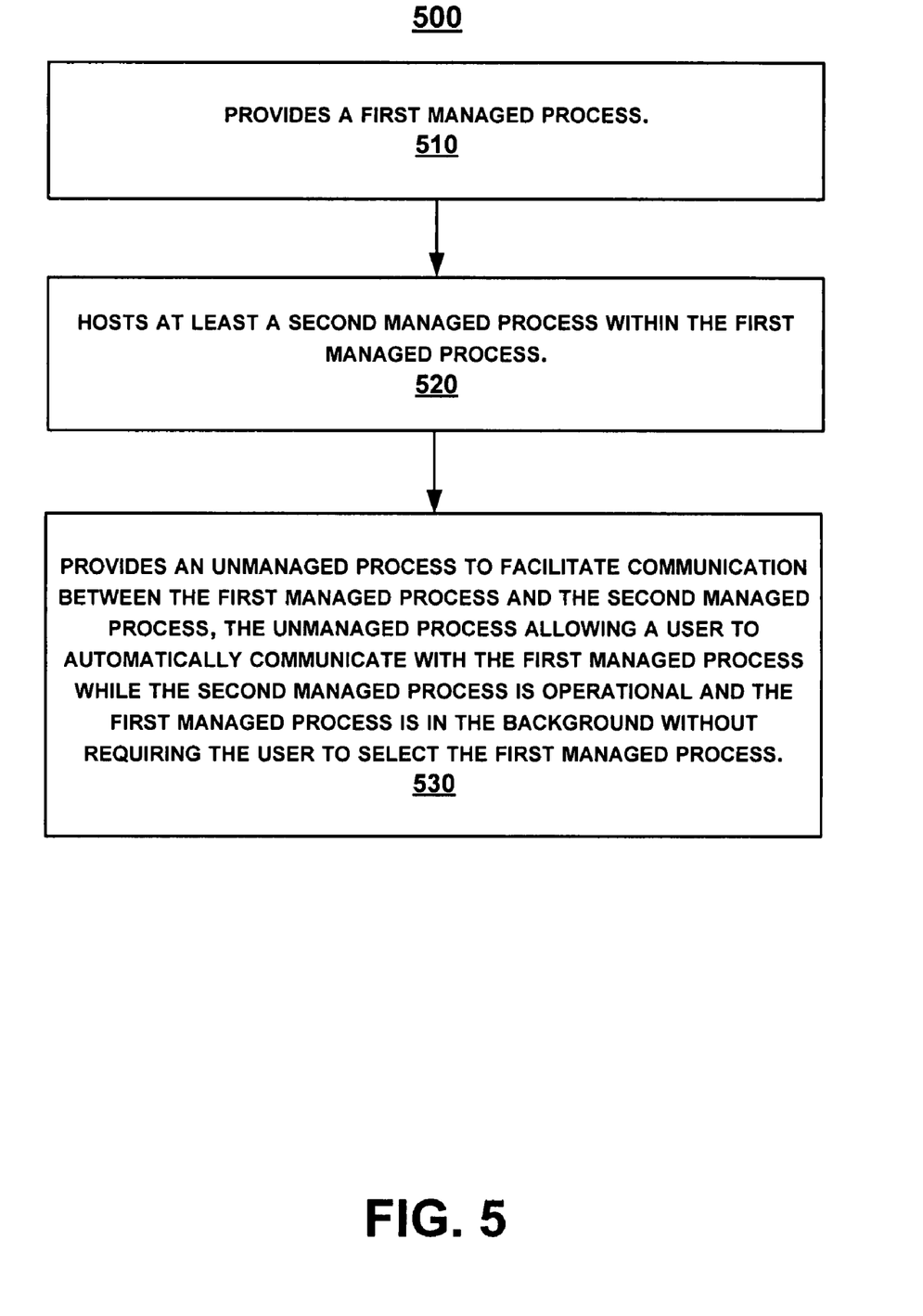
FIG. 5 is a flowchart of an exemplary method for utilizing a first managed process to host at least a second managed process in accordance with one embodiment of the present technology.

With reference now to FIG. 5, a flowchart of an exemplary method for utilizing a first managed process, to host at least a second managed process is described in accordance with one embodiment of the present technology.

Referring now to 510 of FIG. 5 and to FIG. 2, one embodiment provides a first managed process. For purposes of brevity and clarity in the present example, the first managed process is referred to herein as host process 230.

Referring now to 520 of FIG. 5 and also referring to FIG. 2, one embodiment hosts at least a second managed process within first managed process. For purposes of brevity and clarity in the present example, the second managed process is referred to herein as hosted process 210.

Moreover, in one embodiment, hosted process 210 provides a request for message types of interest to host process 230 or interoperator 300. That is, when the hosted process 210 application is initiated within the host process 230 environment, hosted process 210 will provide a list of message types of interest. In other words, hosted process 210 will submit a list, table, or the like, of message types that would refer to processes or operations hosted process 210 is capable or set-up to perform. Moreover, in one embodiment, if a number of processes are being hosted, each of the hosted processes will provide a respective list of message types of interest. In one embodiment, the message types of interest are stored in a database such as database 240.

Referring now to 530 of FIG. 5 and to FIG. 2, one embodiment provides an unmanaged process 220 to facilitate communication between host process 230 and hosted process 210. In one embodiment, unmanaged process 220 utilizes a .NET protocol to facilitate the communication between host process 230 and hosted process 210. That is, because host process 230 and hosted process 210 are out-of-process, they cannot communicate using the in-process COM platform. Instead, host process 230 and hosted process 210 must utilize an out-of-process communication method such as a .NET protocol provided by an unmanaged process.

In one embodiment, as shown in FIG. 4A-C, the unmanaged process 220 allows a user to automatically communicate with host process 230, while hosted process 210 is operational and while host process 230 is in the background. In one embodiment, this communications capability is provided without requiring the user to initially select host process 230 before providing message 205.

For example, as described in FIG. 3, one embodiment receives a message or a plurality of messages from a user input device such as cursor control device 116 or alphanumeric input device 114 of FIG. 1. In other words, the user input device may be any device that is capable of interacting with a computer system such as a keyboard, mouse, remote control, motion recognition device, sense recognition device, joystick, audio and video input devices and the like. In one embodiment, when message 205 is received at hosted process 210 interoperator 300 filters message 205 to host process 230 prior to hosted process 210 reviewing message 205. In another embodiment, interoperator 300 performs the filtering of message 205 at a location other than host process 230.

Once the filtering process is performed by the interoperator 300, as described in conjunction with the discussion of FIGS. 2 and 3 above, message 205 is delivered to the appropriate process. For example, if message 205 is a message type requested by hosted process 210 then message 205 is filtered to hosted process 210. In one embodiment, the filtering is performed and message 205 is delivered to hosted process 210 prior to any other processes accessing the contents of message 205. In another embodiment, when message 205 is not on message type list 250 then message 205 is filtered to host process 230. In one embodiment, the filtering is performed and message 205 is delivered to host process 230 prior to any other processes accessing the contents of message 205.

As shown and described with reference to FIG. 4B, in one embodiment, once message 205 is received at the selected process, a UI 410 from the selected process is provided in the foreground of the display 118. That is, a pop-up window, or the like, will be provided over the hosted process 210 user interface when the message is directed to an underlying process such as host process 230. In so doing, the user is capable of automatically directing message 205 to an underlying process without first selecting the underlying process and making it an overlying process.

In another embodiment, if a plurality of hosted processes 210 are hosted by host process 230, then each hosted process 210 will provide a list of message types of interest. In this case, when message 205 is received, interoperator 300 will compare the received message 205 with the lists provided by every hosted process 210. Then, if a match is found, message filter 330 will direct message 205 to the matching hosted processes 210.

Furthermore, if a plurality of hosted process 210 or even host process 230 are vying for the same message type associated with message 205, then a hierarchy may be established wherein the highest specified process will receive message 205. In one embodiment, the hierarchy may be static. However, in another embodiment, the hierarchy may be dynamic and may be based on which process is in the foreground, which has most time used, which is set to default, and the like.

Object Model Access

Figure 6:
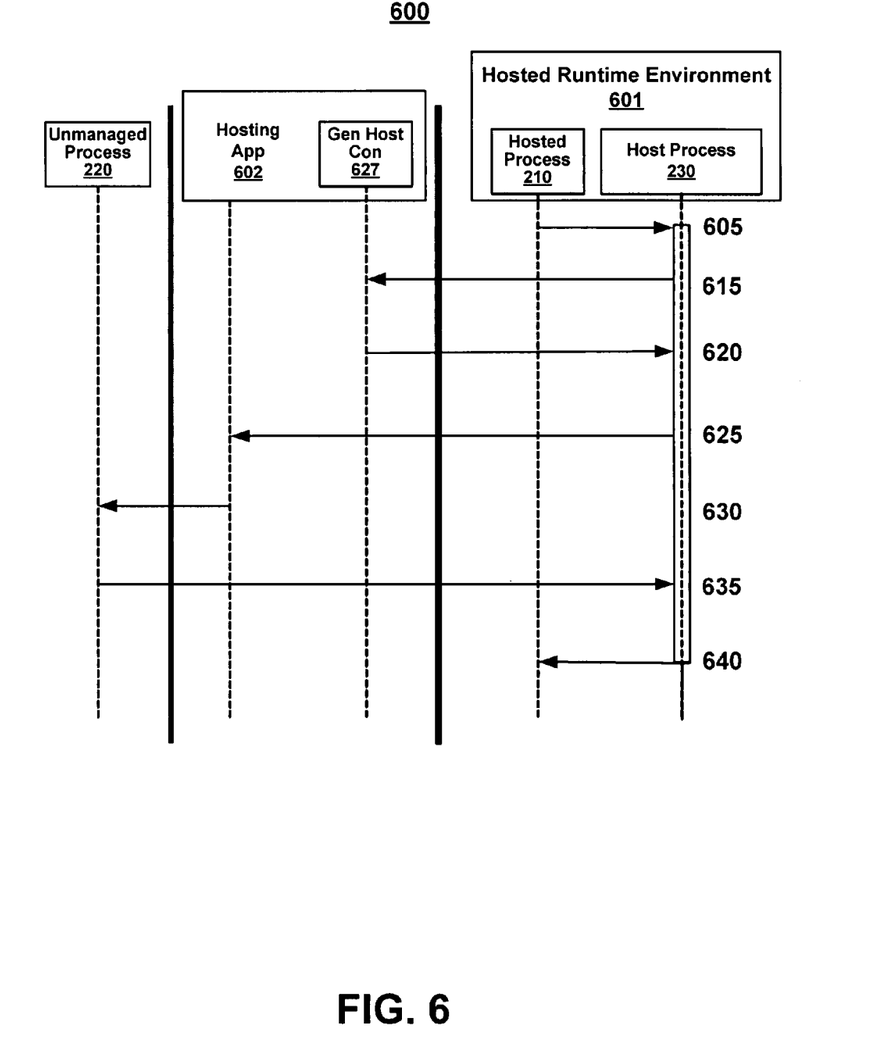
FIG. 6 is a flow diagram of an exemplary method for hosting a process in accordance with one embodiment of the present technology.

With reference now to FIG. 6, a flow diagram 600 of an exemplary method for hosting a hosted process 210 is shown in accordance with one embodiment of the present technology.

At 605 the hosted process 210 attempts to contact host process 230. In one embodiment, host process 230 will initially establish that hosted process 210 is, in fact, running in the same hosted runtime environment 601 as host process 230. At 615, host process 230 contacts generic hosting confirmer 627 and requests confirmation that that hosted process 210 is authorized to be hosted by host process 230. At 620, generic hosting confirmer 627 provides confirmation to host process 230 that hosted process 210 is authorized to be hosted by host process 230.

As shown in 625, host process 230 then accesses hosting application 602 and requests a communication pipeline be established for hosted process 210. At 630, hosting application 602 will access unmanaged process 220 and request a communications interface for utilization between host process 230 and hosted process 210. With reference now to 635, unmanaged process 220 establishes a communications interface between host process 230 and hosted process 210 and informs host process 230 of the available communication interface. At 640, host process 230 and hosted process 210 begin communicating over the communications interface. In one embodiment, the communications interface is persistent. That is, the communications interface will remain operational as long as hosted process 210 remains operational and hosted by host process 230.

Thus, the present technology provides a system and method for utilizing a first managed process to host at least a second managed process. Moreover, the present technology provides a system and method for utilizing a first managed process to host at least a second managed process regardless of the communication type utilized by either of the two processes. Moreover, the present technology allows a hosted process to be launched as a full-screen application in the computing environment, while remaining a well-behaved application within the host process.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
running, on a computing system, a media application as a managed host Process;
providing, by the media application on a display of the computing system, television controls for interacting with a television when the media application is presented in a foreground of the display;
initiating, on the computing system, a browser application as a managed hosted process within a host process environment provided by the media application;
providing, by the browser application to the media application over a communications interface established between the media application and the browser application, a list of message types to be acted on by the browser application;
presenting, by the computing system, the browser application in the foreground of the display and the media application in a background of the display such that the browser application is visible and the television controls provided by the media application are not visible;
receiving, at the media application running on the computing system, a message from a user input device while the browser application is presented in the foreground of the display and the media application is presented in the background of the display;
comparing, by the media application, a message type of the message with the message types to be acted on by the browser application; and
directing, by the media application, the message to the browser application over the communications interface when the message type of the message matches any of the message types to be acted on by the browser application, wherein:
the message is acted on by the media application from the background of the display, without requiring user input to bring the media application to the foreground of the display, when the message type of the message does not match any of the message types to be acted on by the browser application, and
the message is acted on by the browser application from the foreground of the display when the message type of the message matches any of the message types to be acted on by the browser application.

2. The computer-implemented method of claim 1, further comprising:
storing, by the media application on the computing device, the list of the message types to be acted on by the browser application in a database of message types of interest to hosted processes of the media application.

3. The computer-implemented method of claim 2, further comprising:
comparing the message type of the message against the database of message types of interest to hosted processes of the media application.

4. The computer-implemented method of claim 1, further comprising:
filtering every message received at the computing device to the media application for review as long as the browser application is running in the host process environment provided by the media application.

5. The computer-implemented method of claim 1, wherein:
the media application and the browser application are implemented utilizing object-oriented programming.

6. The computer-implemented method of claim 1, wherein:
the communications interface is provided by an unmanaged process implemented utilizing a .NET protocol.

7. The computer-implemented method of claim 1, wherein:
the browser application is run out-of-process with respect to the media application.

8. The computer-implemented method of claim 1, wherein:
the message type of the message received at the media application while the browser application is presented in the foreground of the display and the media application is presented in the background of the display is a television show listing request,
the message is acted on by the media application from the background of the display, without requiring user input to bring the media application to the foreground of the display, and
the media application displays a pop-up window including a listing of television shows over the browser application presented in the foreground of the display.

9. A computing device configured to run a media application and a browser application, the computing device comprising:
- a processor for executing computer-executable instructions; and
- memory storing computer-executable instructions for causing the computing device to perform a computer-implemented method comprising:
  - running the media application as a managed host process;
  - providing, by the media application on a display of the computing device, television controls for interacting with a television when the media application is presented in a foreground of the display;
  - initiating the browser application as a managed hosted process within a host process environment provided by the media application;
  - providing, by the browser application to the media application over a communications interface established between the media application and the browser application, a list of message types to be acted on by the browser application;
  - presenting the browser application in the foreground of the display and the media application in a background of the display such that the browser application is visible and the television controls provided by the media application are not visible;
  - receiving, at the media application, a message from a user input device while the browser application is presented in the foreground of the display and the media application is presented in the background of the display;
  - comparing, by the media application, a message type of the message with the message types to be acted on by the browser application; and
  - directing, by the media application, the message to the browser application over the communications interface when the message type of the message matches any of the message types to be acted on by the browser application, wherein:
    - the message is acted on by the media application from the background of the display, without requiring user input to bring the media application to the foreground of the display, when the message type of the message does not match any of the message types to be acted on by the browser application, and
    - the message is acted on by the browser application from the foreground of the display when the message type of the message matches any of the message types to be acted on by the browser application.

10. The computing device of claim 9, wherein the message is received by the media application from an input device comprising at least one of: a keyboard, a mouse, a remote control, a motion recognition device, a sense recognition device, a joystick, an audio input device, and a video input device.

11. The computing device of claim 9, wherein:
the media application stores the list of the message types to be acted on by the browser application in a database of message types of interest to hosted processes of the media application.

12. The computing device of claim 9, wherein:
the message type of the message received at the media application while the browser application is presented in the foreground of the display and the media application is presented in the background of the display is a television show listing request,
the message is acted on by the media application from the background of the display, without requiring user input to bring the media application to the foreground of the display, and
the media application displays a pop-up window including a listing of television shows over the browser application presented in the foreground of the display.

13. The computing device of claim 9, wherein the browser application is run out-of-process with respect to the media application.

14. The computing device of claim 9, wherein:
the media application and the browser application are implemented utilizing object-oriented programming; and
the communications interface is provided by an unmanaged process that utilizes a .NET protocol.

15. A computer-storage medium storing computer-executable instructions that, when executed, cause a computer system to perform a computer-implemented method comprising:
running a media application as a managed host process;
providing, by the media application on a display of the computer system, television controls for interacting with a television when the media application is presented in a foreground of the display;
initiating a browser application as a managed hosted process within a host process environment provided by the media application;
providing, by the browser application to the media application over a communications interface established between the media application and the browser application, a list of message types to be acted on by the browser application;
presenting the browser application in the foreground of the display and the media application in a background of the display such that the browser application is visible and the television controls provided by the media application are not visible;
receiving, at the media application, a message from a user input device while the browser application is running in the foreground of the display and the media application is running in the background of the display;
comparing, by the media application, a message type of the message to the message types to be acted on by the browser application; and
directing, by the media application, the message to the browser application over the communications interface when the message type of the message matches any of the message types to be acted on by the browser application, wherein:
the message is acted on by the media application from the background of the display, without requiring user input to bring the media application to the foreground of the display, when the message type of the message does not match any of the message types to be acted on by the browser application, and
the message is acted on by the browser application from the foreground of the display when the message type of the message matches any of the message types to be acted on by the browser application.

16. The computer-storage medium of claim 15, wherein:
the message type of the message received at the media application is for interacting with the television controls provided by the media application, and the message is acted on by the media application from the background of the display, without requiring user input to bring the media application to the foreground of the display.

17. The computer-storage medium of claim 15, wherein:
the media application stores the list of the message types to be acted on by the browser application in a database of message types of interest to hosted processes of the media application.

18. The computer-storage medium of claim 15, further storing computer-executable instructions for:
receiving, at the media application, a plurality of lists of message types of interest from a plurality of managed hosted processes running within the host process environment provided by the media application;
comparing the message type of the message to the plurality of lists of message types of interest; and
directing the message to a specific managed hosted process of the plurality of managed hosted processes running within the host process environment provided by the media application when the message type of the message matches a message type on a list of message types of interest provided to the media application by the specific managed hosted process.

19. The computer-storage medium of claim 15, wherein:
the message type of the message received at the media application while the browser application is presented in the foreground of the display and the media application is presented in the background of the display is a television show listing request,
the message is acted on by the media application from the background of the display, without requiring user input to bring the media application to the foreground of the display, and
the media application displays a pop-up window including a listing of television shows over the browser application presented in the foreground of the display.

20. The computer-storage medium of claim 15, wherein:
the media application and the browser application are implemented utilizing object-oriented programming; and
the communications interface is provided by an unmanaged process implemented utilizing a .NET protocol.

\* \* \* \* \*